United States Patent [19]
Mayer et al.

[11] Patent Number: 5,367,439
[45] Date of Patent: Nov. 22, 1994

[54] SYSTEM FOR FRONTAL ILLUMINATION

[75] Inventors: Ralph D. Mayer, Ambler, Pa.; Len L. Picard, Wilmington; Clifford T. Fitzgerald, Medfield, both of Mass.

[73] Assignee: Cognex Corporation, Needham, Mass.

[21] Appl. No.: 997,767

[22] Filed: Dec. 24, 1992

[51] Int. Cl.$^5$ .................................................. F21V 7/04
[52] U.S. Cl. ...................................... 362/32; 362/302; 362/804; 362/18
[58] Field of Search .................. 362/32, 302, 804, 252, 362/33, 5, 18; 356/1, 376

[56] References Cited

U.S. PATENT DOCUMENTS

| | | | |
|---|---|---|---|
| 4,617,619 | 10/1986 | Gehly | 362/302 X |
| 4,706,168 | 11/1987 | Weisner | 362/32 X |
| 4,914,553 | 4/1990 | Hamada | 362/32 |
| 5,143,436 | 9/1992 | Baylor et al. | 362/32 |

*Primary Examiner*—Larry Jones
*Attorney, Agent, or Firm*—Lahive & Cockfield

[57] ABSTRACT

A frontal illumination system includes a light source and a finite plurality of reflecting surfaces. The reflecting surfaces can be characterized as the inner surfaces of a set of conical frustums arranged to approximate the illumination coming from the inner surface of a hemisphere. The light source is located within or adjacent to at least one of the reflecting surfaces. It emits light that is reflected off opposing portions of at least one, and preferably all, of the surfaces. The system is capable of illuminating the object from a very large solid angle, even though it is disposed in a substantially short axial space.

17 Claims, 4 Drawing Sheets

SYSTEM FOR FRONTAL ILLUMINATION

BACKGROUND OF THE INVENTION

This invention relates to machine vision and, more particularly, to systems for illuminating an object.

Machine vision typically involves illuminating an object, e.g., a semiconductor chip, and capturing an image, by video camera, using the light reflected off the object for computer analysis. Among the prior art illumination techniques are those of "front" lighting and "back" lighting. According to the former, the object is illuminated from the front, e.g., by a small spotlight or flood, and the image is captured for analysis. According to the latter, the object is illuminated from behind and its silhouette is captured by the camera.

A problem with basic implementations of front lighting techniques is that they fail to adequately illuminate some features of the object and, consequently, to enable those features to be captured by the camera. In a front lighting system, some features (or defects) may be positioned or angled in such a way that light reflected off them does not reach the camera. Thus, for example, light reflected off a beveled specular edge may "miss" the camera lens, effectively hiding that feature and preventing its further analysis. Of course, since a back-lighting system illuminates from the rear, features on the face of the object will not be captured.

One prior art front lighting technique, employed in the photographic arts, uses a variant of a continuous hemispherical illuminator to illuminate an object. Here, the object is surrounded by a tent of cloth illuminated uniformly from the outside. A camera lens is placed in a small hole in the cloth to permit the object image to be captured on film.

A problem with this type of frontal illumination is that it tends to produce a dark spot on the object at a position opposite the hole. To minimize that spot, the hole must be small with respect to the distance to the object, requiring a large tent and long focal length lens.

An object of this invention to simulate such tent illumination in a very small space and with lenses that are large with respect to the distance to the object.

Other general and more specific objects of this invention will in part be obvious and evident from the drawings and description which follows.

SUMMARY OF THE INVENTION

These and other objects are attained by the invention which provides, in one aspect, a frontal illumination system (or "reflector") which comprises a light source and a finite plurality of reflecting surfaces arranged to illuminate an object, e.g., electronic components. The reflecting surfaces can be characterized as the inner surfaces of a set of conical frustums arranged to approximate the illumination coming from the inner surface of a hemisphere.

The light source is located within or adjacent to at least one of the reflecting surfaces. It emits light that is reflected off an opposing portion of at least one, and preferably all, of the surfaces. The light source can comprise, for example, a series of light-emitting portals or apertures in one of the conical surfaces.

According to a further aspect of the invention, the reflector has a hole in the center, i.e., in the region corresponding to that portion of the hemisphere furthest from the object. Light reflecting off the object passes through that hole for routing, e.g., via a beam-splitter to a camera. A further light source, e.g., positioned behind the beam-splitter, fills in this hole and, thereby, more completely illuminates the object.

These and other aspects of the invention are evident in the drawings and in the description which follows.

BRIEF DESCRIPTION OF THE DRAWINGS

The foregoing and other aspects of the invention, may be more fully understood from the following description, when read together with the accompanying drawings in which.

DETAILED DESCRIPTION OF ILLUSTRATED EMBODIMENT

Figure 1:
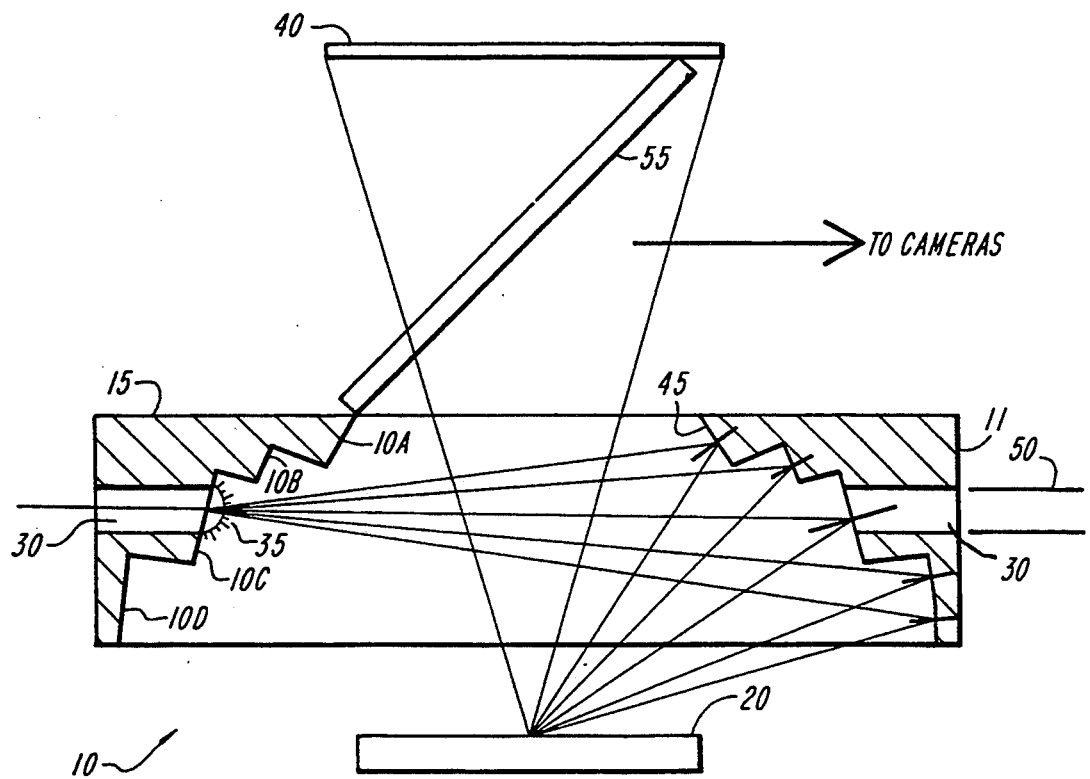
FIG. 1 is a schematic diagram of a preferred frontal illumination system according to the invention.

FIG. 1 depicts an improved frontal illumination system constructed according to a preferred practice of the invention. The system 10 includes a housing 15 comprising a reflecting surfaces 10A–10D.

Interposed within the reflecting surface 10C are a series of light-emitting portals 30. Together, the portals 30 make up light sources 35 that preferably emit light in the visible spectrum (but can also emit radiation in other spectra, e.g., ultraviolet or infrared). A fiber optic cable 50 provides visible Light (or other radiation, e.g., UV or IR) to the illuminating portals 30 from a light source 60 (not shown).

It will be appreciated that light sources 35 can utilize light-emitting mechanisms other than the illustrated fiber optics, e.g., light-emitting diodes or incandescent sources.

An extended central light source 40 is disposed above the reflecting surfaces 10A–10D. A beam-splitter 55 is interposed between the housing 15 (and reflecting surfaces 10A–10D) and the central or overhead light source 40.

The reflecting surfaces 10A–10D are arranged to approximate the illumination provided by a hemispherical source. When light emitted by light sources 35 is reflected from those surfaces, it lights the object 20 from a large solid angle, e.g., approaching 180°, approximating the light from a hemisphere. Illumination for the otherwise absent central portion of the hemisphere is provided by central light source 40.

Figure 5:
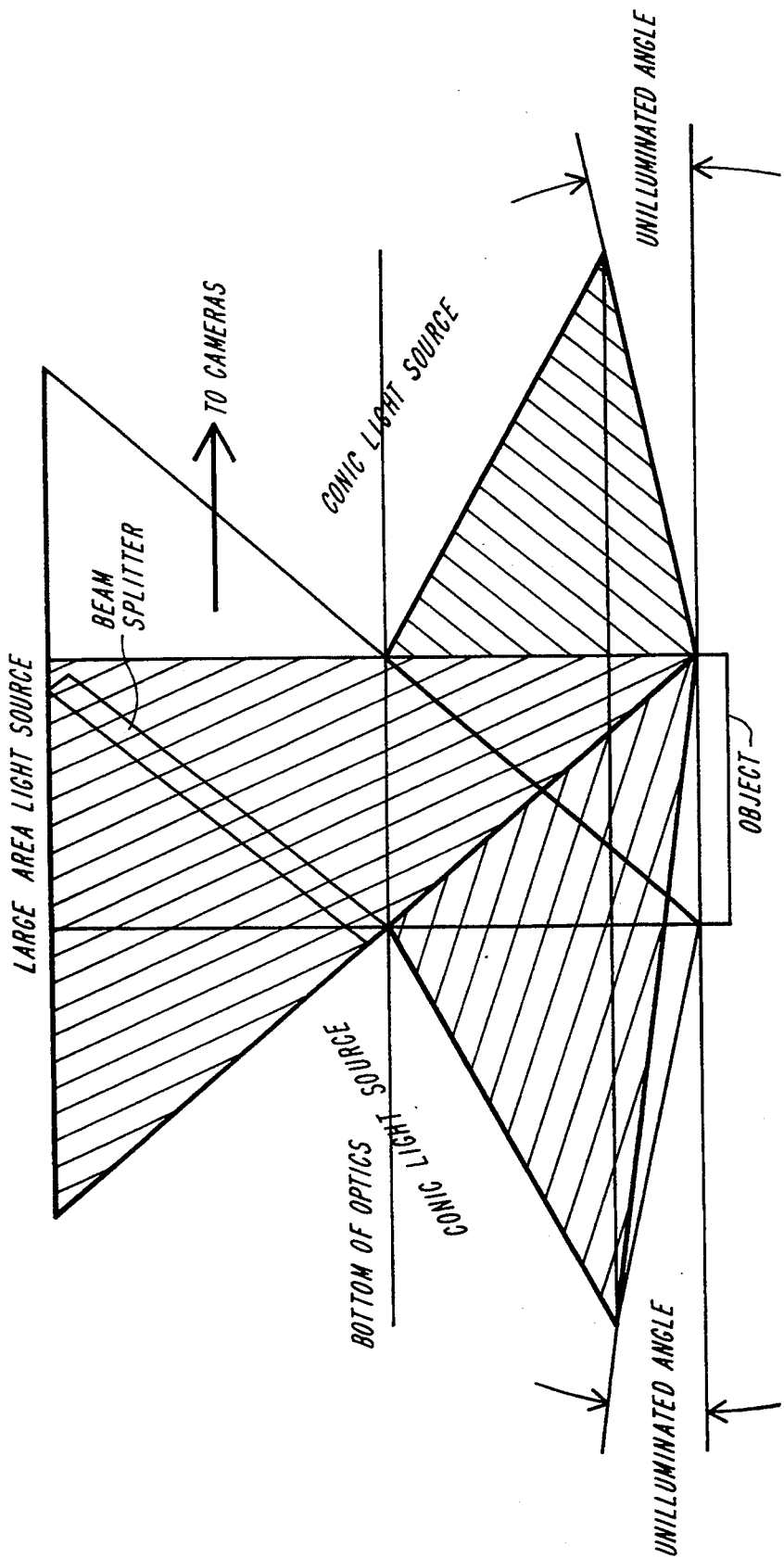
FIG. 5 is a schematic depiction of an ideal illumination system approximated by the invention hereof.

Referring to FIG. 5, there is shown a schematic of an ideal illumination system approximated by the invention hereof. The illustrated system comprises an extended conic light source with hole positioned centrally therein. A beam-splitter is disposed behind that hole, e.g., at 45°, so that the object can be viewed through the hole. Behind the beam-splitter is a light source large enough so that every point on the object "sees" light subtended by that hole.

The conic source does not completely simulate the outer portion of a hemispherical source in that it does not illuminate the object from the extreme outer edges.

The conic source does not extend to the object plane and, instead, provides a space to permit movement and handling of the object.

Figure 2:
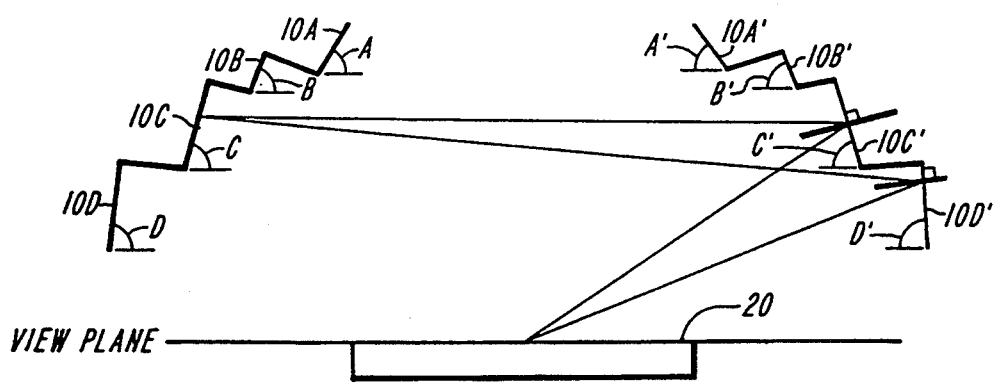
FIG. 2 illustrates the orientation of inner reflecting surfaces of the frontal illuminating system of FIG. 1.

FIG. 2 illustrates a preferred orientation of the reflecting surfaces 10A–10D. As illustrated, those surfaces are disposed at different angles, represented by the designations A, B, C and D, with respect to the view plane of object 20.

The reflecting surfaces 10A–10D may be characterized as conical Frustrums that open toward the object 20. More particularly, the surfaces 10A–10D are oriented so that light coming from the source is reflected to the center of the object, i.e., the reflector is perpendicular to the bisector of the angle subtended by a ray coming from the light source and going to the center of the object. The reflecting surfaces 10A–10D are not specular; rather, they are diffuse. Thus, each serves, in effect, as an extended source. And, because they are diffuse, the angles at which the surfaces are manufactured need not be as exact.

The height of each reflecting surface, e.g., 10A, is selected to minimize the extent of the respective dark zone as "seen" from the object (or as reflected by a specular spherical object).

The reflecting surfaces 10A–10D are connected via non-reflecting surfaces (as illustrated) that are disposed perpendicular to the corresponding reflecting surface closest to the object. Those skilled in the art will appreciate that this results in ease of manufacture of the part (to wit, each reflecting surface and its corresponding non-reflecting counterpart can be tooled using a rotating bit oriented so that the tip cuts the reflecting surface at the desired angle). The non-reflecting surfaces are, preferably, painted flat-black to prevent stray illumination.

Figure 6:
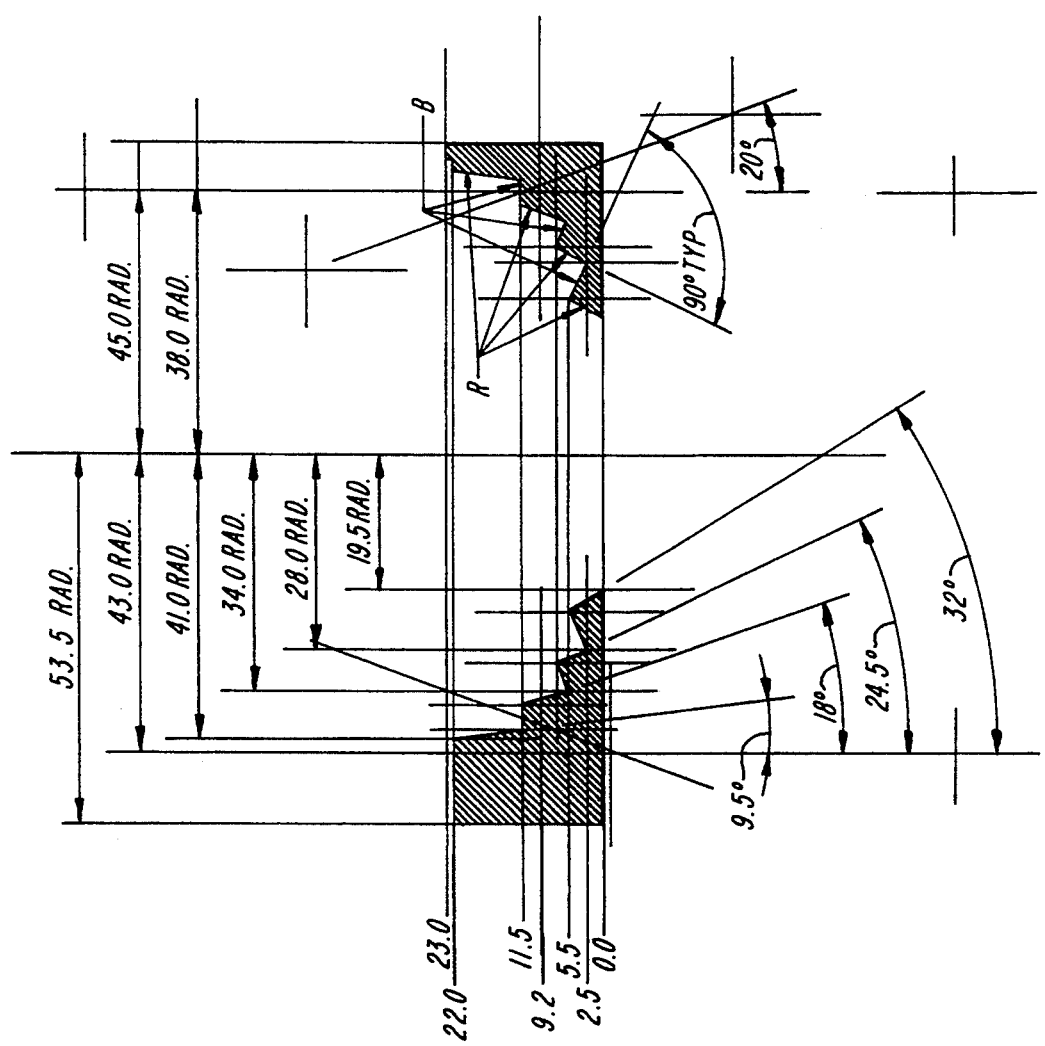
FIG. 6 depicts the dimensions of a preferred frontal illumination system according to the invention.

The specific dimensions of a preferred system 10 are shown in FIG. 6.

Figure 3:
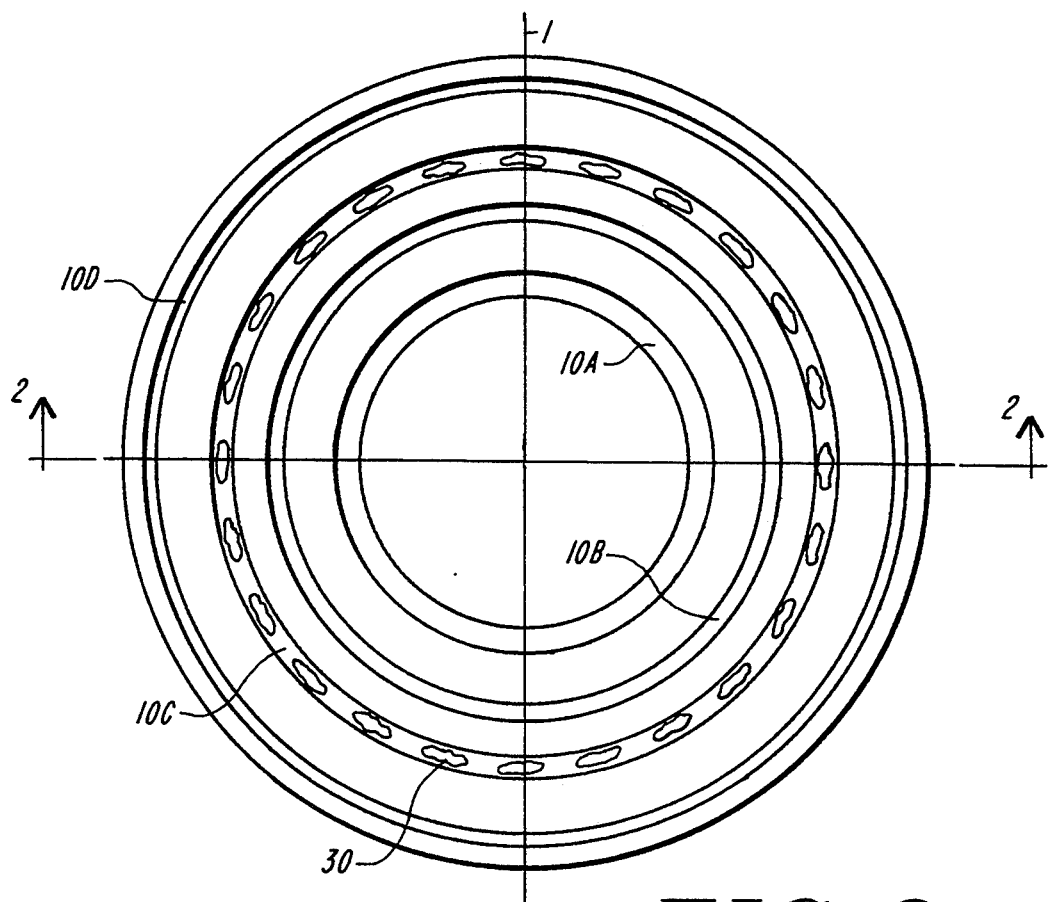
FIG. 3 is a bottom view of the frontal illuminating system of FIG. 1.

FIG. 3 depicts a bottom view of a reflector constructed in accord with a preferred embodiment of the invention. The drawing shows reflecting surfaces 10A–10D and apertures 30 for horizontal light sources 35.

Figure 4:
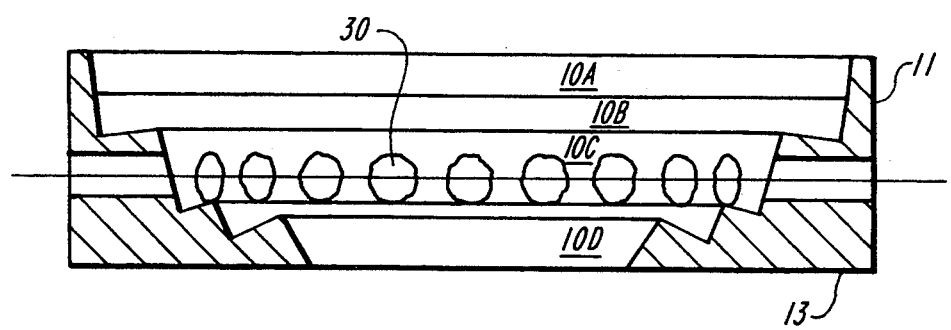
FIG. 4 is a cross-section view taken along line 2—2 of FIG. 3.

FIG. 4 is a cross-sectional view of reflector 10 taken along line 2—2 (of FIG. 3). The drawing shows reflecting surfaces 10A–10D and apertures 30. As illustrated, the apertures are evenly spaced along reflecting surface 10C. Each preferably emits light at an angle just sufficient to cover the opposing reflecting surfaces in a substantially uniform manner. As discussed above, each aperture is coupled via a fiber optic cable to a remote light source.

In the above-described preferred embodiment of the invention having four reflecting surfaces, surface 10C preferably includes twenty-four apertures 30 making up light sources 35. Of course, a continuous ring of apertures (e.g., each, one optic fiber in diameter) is preferable. It will be appreciated, of course, that the reflector could employ other numbers of reflecting surfaces and apertures. With respect to the latter, the apertures are preferably arranged to insure maximal uniform reflective lighting from the entirety of the illuminating surfaces.

Referring to FIG. 1, the overhead or central light source 40 illuminates the object 20 from above thereby illuminating the object at angles not otherwise covered by light sources 35 and reflecting surfaces 10A–10D. As noted above, the combination of the two light sources 35 and 40 illuminates the object 20 in the manner of a substantially semi-hemispherical source and, thereby, ensures that all features present on the surface of the object 20 will be illuminated from all frontal directions (i.e., 180° solid-angle illumination).

With further reference to FIG. 1, beam-splitter 55 is interposed between the light source 40 and housing 15. The beam-splitter is arranged to pass light from the source 40 to the object surface while, at the same time, reflecting the illuminated object image to the cameras. The beam splitter is of conventional construction and design arranged at a suitable angle (e.g. 45°) with respect to the object surface.

In accordance with the above description, the invention attains the objects set forth. It is further intended that all matter and the description and drawings be interpreted as illustrative and not in a limiting sense. That is, while various embodiments of the invention have been described in detail, other alterations which will be apparent to those skilled in the art are intended to be embraced within the spirit and scope of the invention.

Thus, for example, whereas the preferred embodiment illuminates the object with light in the visible spectrum, other embodiments illuminating the object with radiation in other spectra also fall within the scope of the claimed invention.

And, for example, whereas the illustrated embodiment relies on fiber optics to transfer and emit the illuminating radiation, other embodiments, such as those utilizing light emitting diodes (LED's) or incandescent sources, also fall within the scope of the claimed invention.

The invention is to be defined, therefore, not by the preceding detailed description but by the claims that follow.

We claim:

1. An optical-mechanical apparatus for reflecting illuminating radiation onto an object, said apparatus comprising
   A. a finite plurality of reflecting surfaces arranged for reflecting at least a portion of said radiation onto said object,
   B. each said reflecting surface being characterized as an inner surface of a conical frustum, or portion thereof, opening toward said object, the cross-sectional centers of which are substantially aligned along an axis perpendicular to a viewing plane of said object, and
   C. light source means, disposed substantially adjacent to a cross-sectional plane of at least one of said reflecting surfaces, for generating illuminating radiation for reflection off at least a portion of at least one of said reflecting surfaces.

2. An apparatus according to claim 1, wherein each respective conical frustum surface, or portion thereof, is characterized by each said respective surface being sequentially characterized by a respective increasing distance relative to said object, and a respective decreasing angle of reflection with respect to said viewing plane of said object.

3. An apparatus according to claim 2, wherein each said reflecting surface comprises an inner surface of substantially an entire conical frustum.

4. An apparatus according to claim 3, wherein said light source means is disposed within at least one of said reflecting surfaces.

5. An apparatus according to claim 4, wherein said light source means comprises a plurality of illuminating radiation-generating portals, each arranged for generating illuminating radiation for reflection off an opposing portion of at least one of said reflecting surfaces.

6. An apparatus according to claim 5, wherein said reflecting surfaces are arranged to subtend a dispersion angle of said light source means.

7. An apparatus according to claim 6, comprising
   A. remote radiation-generating means for generating said illuminating radiation, and
   B. fiber optic means, coupled to said remote radiation-generating means, for transmitting that radiation to said light source means.

8. An apparatus according to claim 1, wherein said reflecting surfaces are arranged to define an aperture through which radiation reflected off said object may be detected.

9. An apparatus according to claim 8, comprising central illuminating means for passing radiation through said aperture for further illumination of said object.

10. An apparatus according to claim 9, wherein said central illuminating means illuminates said object at an angle not otherwise illuminated by said reflecting surfaces.

11. An apparatus according to claim 1, wherein
   A. said central illuminating means is displaced from said plural reflecting surfaces, and wherein said plural reflecting surfaces are disposed between said central illuminating means and said object,
   B. said apparatus further comprises beam-splitter means, disposed between said central illuminating means and said plural reflecting surfaces, for
      i) passing at least a portion of the radiation generated by said central illuminating means to said object, and
      ii) reflecting at least a portion of the radiation reflected from said object for detection.

12. An apparatus according to claim 11, wherein said light source means generates radiation in the visible spectrum.

13. An apparatus according to claim 11 wherein said detection means comprises a photoreceptor.

14. An optical-mechanical apparatus for large-angle, close-quarters illumination of an object, said apparatus comprising
   A. first light source means for generating illuminating radiation,
   B. a finite plurality of reflecting surfaces arranged for reflecting at least a portion of that radiation onto said object,
   said reflecting surfaces being characterized as inner surfaces of respective conical frustums opening toward said object, the cross-sectional centers of which are substantially aligned along an axis perpendicular to a viewing plane of said object,
   C. said reflecting surfaces being arranged to define an aperture through which radiation reflected off said object may be detected,
   D. second light source means, comprising an extended illumination source, for passing radiation through said aperture for further illumination of said object, and
   E. whereby said object is illuminated as if by a spatially continuous, large-angle source approaching a 180° included solid angle.

15. An optical-mechanical apparatus for reflecting illuminating radiation onto an object, said apparatus comprising
   A. a finite plurality of reflecting surfaces arranged for reflecting at least a portion of said radiation onto said object, said reflecting surfaces being arranged to define an aperture through which radiation reflected off said object may be detected,
   B. each said reflecting surface being characterized as an inner surface of a conical frustum, or portion thereof, the cross-sectional centers of which are substantially aligned along an axis perpendicular to a viewing plane of said object,
   C. light source means, disposed substantially adjacent to a cross-sectional plane of at least one of said reflecting surfaces, for generating illuminating radiation for reflection off at least a portion of at least one of said reflecting surfaces,
   D. central illuminating means for passing radiation through said aperture for further illumination of said object at an angle not otherwise illuminated by said reflecting surfaces, and
   E. beam-splitter means, disposed between said central illuminating means and said plural reflecting surfaces, for
      i) passing at least a portion of the radiation generated by said central illuminating means to said object, and
      ii) reflecting at least a portion of the radiation reflected from said object for subsequent detection.

16. An apparatus according to claim 15, wherein said light source means generates radiation in the visible spectrum.

17. An apparatus according to claim 15 wherein said detection means comprises a photoreceptor.

* * * * *